US011537744B2

(12) United States Patent
Dotan-Cohen et al.

(10) Patent No.: US 11,537,744 B2
(45) Date of Patent: Dec. 27, 2022

(54) SHARING USER INFORMATION WITH AND BETWEEN BOTS

(71) Applicant: Microsoft Technology Licensing, LLC, Redmond, WA (US)

(72) Inventors: Dikla Dotan-Cohen, Herzliya (IL); Ido Priness, Herzliya (IL); Haim Somech, Herzliya (IL)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 17/067,714

(22) Filed: Oct. 11, 2020

(65) Prior Publication Data
US 2021/0026984 A1 Jan. 28, 2021

Related U.S. Application Data

(63) Continuation of application No. 15/832,701, filed on Dec. 5, 2017, now Pat. No. 10,810,322.

(51) Int. Cl.
*H04L 29/06* (2006.01)
*G06F 21/00* (2013.01)
*G06F 21/62* (2013.01)
*H04L 9/40* (2022.01)
*H04L 51/04* (2022.01)
*H04L 51/02* (2022.01)
*H04L 51/18* (2022.01)

(52) U.S. Cl.
CPC ...... *G06F 21/6245* (2013.01); *G06F 21/6227* (2013.01); *H04L 51/02* (2013.01); *H04L 51/04* (2013.01); *H04L 63/102* (2013.01); *H04L 63/105* (2013.01); *H04L 63/205* (2013.01); *H04L 51/18* (2013.01)

(58) Field of Classification Search
CPC . G06F 21/6245; G06F 21/6227; H04L 51/02; H04L 51/04; H04L 63/102; H04L 63/105; H04L 63/205; H04L 51/18
See application file for complete search history.

(56) References Cited

U.S. PATENT DOCUMENTS

| 2017/0295119 | A1* | 10/2017 | Rosenberg | ............. H04L 51/32 |
| 2018/0090137 | A1* | 3/2018 | Horling | ............... G06F 16/9535 |
| 2018/0316630 | A1* | 11/2018 | Jacobson | ................ H04L 67/10 |
| 2018/0316631 | A1* | 11/2018 | Koukoumidis | ..... G06F 16/3329 |
| 2018/0357286 | A1* | 12/2018 | Wang | ................ G06F 16/24578 |
| 2019/0166070 | A1* | 5/2019 | Dey | .................... G06K 9/00228 |

FOREIGN PATENT DOCUMENTS

EP 3211840 A1 * 8/2017 ............. H04L 51/02

* cited by examiner

*Primary Examiner* — Lisa C Lewis
(74) *Attorney, Agent, or Firm* — Shook, Hardy & Bacon L.L.P.

(57) ABSTRACT

Systems, methods, and computer-readable storage media are provided for sharing user-information with bots. An automated task to be performed on behalf of a user is determined from at least one user message provided to a user interface of a first bot. A second bot is determined that is capable of performing the automated task on behalf of the user. User information of the user to provide to the second bot for the performing of the automated task is determined. Content of the user information is based on a trust level of the second bot and service parameters for completing the automated task. The first bot provides the determined user information to the second bot using one or more network communications.

20 Claims, 6 Drawing Sheets

SHARING USER INFORMATION WITH AND BETWEEN BOTS

CROSS-REFERENCE TO RELATED APPLICATIONS

This application is a continuation of U.S. patent application Ser. No. 15/832,701, filed Dec. 5, 2017, entitled "SHARING USER INFORMATION WITH AND BETWEEN BOTS," now issued as U.S. Pat. No. 10,810,322, which application is incorporated herein by reference in its entirety.

BACKGROUND

Robots, or bots, are software applications that may be used to provide services to users through user interactions. In a session with a bot, a user typically provides a set of information the bot uses to perform an automated task for the user. For example, a bot may be used to book a flight, provide customer support, or order food based on user provided information. A session may include turns taken by the bot and the user in a conversational format where the bot requests particular information, and the user manually provides information in response. A chat window, a voice interface, or other conversational interface can be used to facilitate a session with a bot.

Often, when a session is initiated with a bot, the bot has little or no information about a particular user. Each user that begins a session with the bot may be asked the same initial user screening questions. Over the course of the session, the bot may request information from the user, such as personal information and other details related to the automated task. Once information is shared with a bot, there is a risk that the information may be used in an unwanted or malicious manner. For example, unbeknownst to the user, the information may be provided to a third party program or organization that uses the information in a manner unrelated to the automated task. Thus, bots pose serious threats to the security and privacy of information.

SUMMARY

This summary is provided to introduce a selection of concepts in a simplified form that are further described below in the detailed description. This summary is not intended to identify key features or essential features of the claimed subject matter, nor is it intended to be used in isolation as an aid in determining the scope of the claimed subject matter.

Aspects of the present disclosure provide for sharing user information with and between bots in a manner that allows the bots to complete automated tasks on behalf of users in a secure and efficient manner. In various embodiments, interfaces are managed over which user information is provided to the bots to facilitate the bots performing automated tasks. The user information is shared using trust levels associated with the bots. This can include using a trust level to determine whether to engage with a bot for performance of an automated task and/or whether to share the user information with the bot. The trust level can also be used to determine the content of user information in order to determine what is shared with the bot. The content can further be determined based on service parameters for completing the automated task, which can be learned for particular bots, groups of bots, automated tasks, and/or service types based on previous interactions with one or more bots.

In further respects, the disclosure includes providing bots with constraints on sharing user information with other parties. For example, the constraints may be provided in association with a particular user session and/or group of user information that is provided to the bot. The constraints can impose limits on the bot sharing the user information with other computing entities, such as other bots. The limits may be absolute or conditional, such as based on a trust level, reliability, service type, and/or other qualities or properties of potential recipient computing entity (e.g., bot) and/or purpose for the sharing of the user information. The user information shared with a bot and constraints provided in association with the user information can be recorded and utilized to determine whether or a likelihood of whether the bot has violated any constraints. This determination can be used to update the trust level of the bot or to otherwise restrict or prevent future sharing of user information with the bot.

BRIEF DESCRIPTION OF THE DRAWINGS

Aspects of the disclosure are described in detail below with reference to the attached drawing figures, wherein.

DETAILED DESCRIPTION

Figure 1:
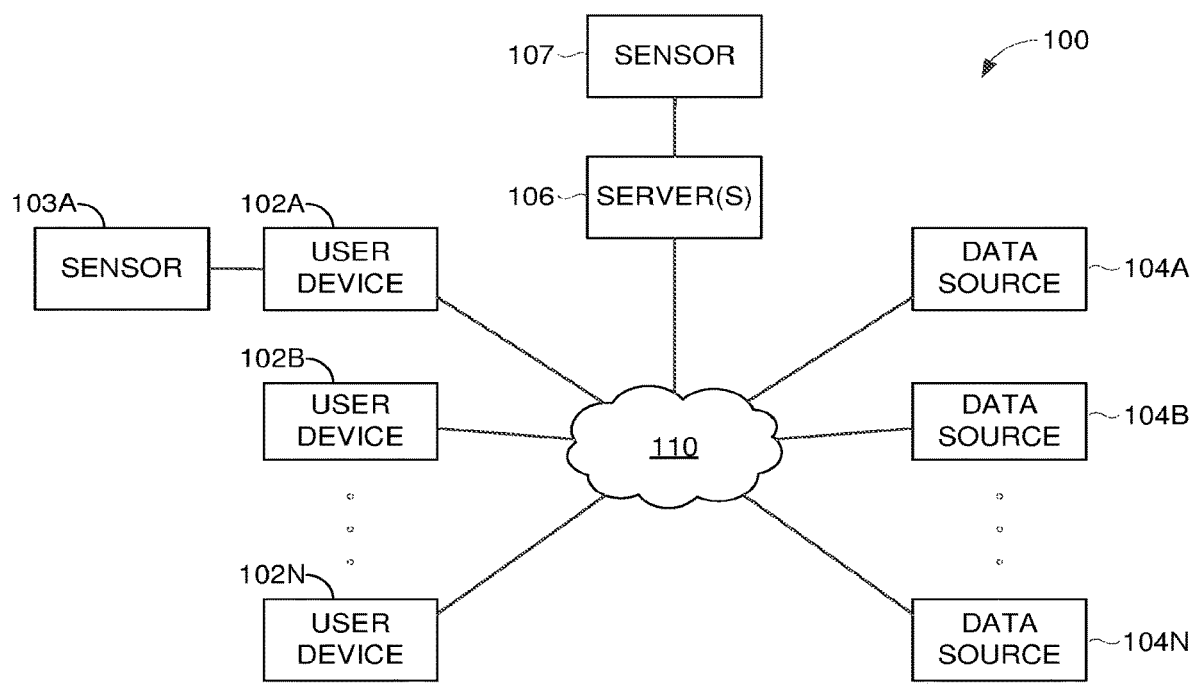
FIG. 1 is a block diagram of an example operating environment suitable for implementations of the present disclosure.

The subject matter of aspects of the present disclosure is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Aspects of the present disclosure provide for sharing user information with and between bots in a manner that allows the bots to complete automated tasks on behalf of users in a secure and efficient manner. In conventional approaches, when a session is initiated with a bot, the bot has little or no information about a particular user. For example, a user may anonymously navigate to a website and begin using a bot on the website. Thus, each user that begins a session with the bot may be asked the same initial screening questions.

Approaches described herein allow for the sharing of user information with bots. Bots can utilize this information to reduce the transmissions of messages requesting this information from users, conserving computing resources and improving user interaction efficiency and performance. Further, the user information can provide the bots with user context, such that automated tasks can be completed in a more computationally efficient and personalized manner. For example, rather than providing the user with unwanted or irrelevant information, the bots can provide relevant information to streamline completion of the automated tasks. This can include the bot selecting a dialogue state based on the user information and/or selecting between available action variants for communicating with the user (e.g., upon initiation of a user session).

Over the course of a conventional session, a bot may request information from the user, such as personal information and other details related to the automated task. Once information is shared with a bot, there is a risk that the information may be used in an unwanted or malicious manner. For example, unbeknownst to the user, the information may be provided to a third party program or organization that uses the information in a manner unrelated to the automated task. Thus, bots pose serious threats to the security and privacy of information.

In conventional approaches, a user typically interacts directly with a bot through the bot's associated user interface. The present disclosure provides for either direct or indirect interactions with bots by users and/or computing entities (e.g., other bots) on behalf of users. For example, approaches described herein contemplate a bot interface manager for sharing information with a bot used directly by a user. Approaches described herein further contemplate the bot interface manager sharing information with a bot that a user is not directly interacting with, on behalf of the user. For example, one bot could delegate completion of an automated task to the bot and use the bot interface manager to share the user information for that purpose.

In various embodiments, the bot interface manager manages interfaces over which user information is provided with bots to facilitate the bots performing automated tasks. The user information can be shared using trust levels associated with the bots. This can include using a trust level to determine whether to engage with a bot for performance of an automated task and/or whether to share the user information with the bot. For example, the bot interface manager may disfavor or avoid bots with lower trust levels when selecting a bot to perform an automated task or determining whether to share user information with the bot. The trust level can also be used to determine the content of user information in order to determine what is shared with the bot. The content may be less specific for a bot with a lower trust level or certain content may not be shared. For example, a bot with a higher trust level may be provided a user's age, whereas a bot with a lower trust level may be provided with an age range (e.g., over 18).

The content can further be determined based on service parameters for completing the automated task, which can be learned for particular bots and/or service types based on previous interactions with one or more bots. For example, by analyzing previous user sessions, the system can learn what user information a bot needs to complete an automated task as well as the level of specificity of that information. This can reduce the number of messages that are exchanged with the bot due to the bot having insufficient or incomplete user information (e.g., the bot may not need to a request the user information). Additionally, this can enhance the security of user data, as the system can avoid providing the bot with overly specific user information by tailoring the specificity to what is needed by the bot.

In further respects, the disclosure includes providing bots with constraints, or rules, on the bots sharing user information. For example, the constraints may be provided in association with a particular user session and/or group of user information that is provided to the bot. The constraints can impose limits on the bot sharing the user information with other computing entities, such as other bots. The limits may be absolute or conditional, such as based on a trust level, service type, and/or other qualities or properties of a computing entity (e.g., bot) that could receive the user information downstream and/or a purpose for the sharing of the user information (e.g., for completion of the automated task). The user information shared with a bot and constraints provided in association with the user information can be recorded on the system and utilized to determine whether or a likelihood of whether the bot has violated any constraints. This determination can be used to update the trust level of the bot or to otherwise restrict or prevent future sharing of user information with the bot.

Turning now to FIG. 1, a block diagram is provided showing an example operating environment 100 in which some embodiments of the present disclosure may be employed. It should be understood that this and other arrangements described herein are set forth only as examples. Other arrangements and elements (e.g., machines, interfaces, functions, orders, and groupings of functions) can be used in addition to or instead of those shown, and some elements may be omitted altogether for the sake of clarity. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, some functions may be carried out by a processor executing instructions stored in memory.

Among other components not shown, example operating environment 100 includes a number of user computing devices, such as user devices 102A and 102B through 102N; a number of data sources, such as data sources 104A and 104B through 104N; one or more servers 106; sensors 103A and 107; and network 110. It should be understood that operating environment 100 shown in FIG. 1 is an example of one suitable operating environment. Each of the components shown in FIG. 1 may be implemented via any type of computing device, such as computing device 600 described in connection to FIG. 6, for example. These components may communicate with each other via network 110, which may include, without limitation, one or more local area networks (LANs) and/or wide area networks (WANs). In exemplary implementations, network 110 comprises the Internet and/or a cellular network, amongst any of a variety of possible public and/or private networks.

It should be understood that any number of user devices, servers, and data sources may be employed within operating environment 100 within the scope of the present disclosure. Each may comprise a single device or multiple devices cooperating in a distributed environment. For instance, server 106 may be provided via multiple devices arranged in a distributed environment that collectively provide the functionality described herein. Additionally, other components not shown may also be included within the distributed environment.

User devices 102A and 102B through 102N can be client user devices on the client-side of operating environment 100, while server 106 can be on the server-side of operating environment 100. Server 106 can comprise server-side software designed to work in conjunction with client-side software on user devices 102A and 102B through 102N, so as to implement any combination of the features and functionalities discussed in the present disclosure. This division of operating environment 100 is provided to illustrate one example of a suitable environment, and there is no requirement for each implementation that any combination of server 106 and user devices 102A and 102B through 102N remain as separate entities.

User devices 102A and 102B through 102N may comprise any type of computing device capable of use by a user. For example, in one embodiment, user devices 102A through 102N may be the type of computing device described in relation to FIG. 5 herein. By way of example and not limitation, a user device may be embodied as a personal computer (PC), a laptop computer, a mobile or mobile device, a smartphone, a tablet computer, a smart watch, a wearable computer, a personal digital assistant (PDA) device, a music player or an MP3 player, a global positioning system (GPS) or device, a video player, a handheld communications device, a gaming device or system, an entertainment system, a vehicle computer system, an embedded system controller, a camera, a remote control, a bar code scanner, a computerized meter or measuring device, an appliance, a consumer electronic device, a workstation, or any combination of these delineated devices, a combination of these devices, or any other suitable computer device.

Any of user devices 102A through 102N can include an operating system, local storage, and one or more applications, services, and API layers. The operating system can comprise the system software that manages computer hardware or software resources of the user device and provides common services for computer programs such as applications, services, and API layers. The operating system may be a single-task or multitask operating system. By way of example and without limitation, examples of operating systems include Microsoft Windows, Microsoft Windows Mobile, Google Android, Google Chrome, Apple iOS, Apple OSX, Linux, Nokia Symbian, Blackberry OS, etc. Where there are multiple user devices (e.g., client user devices), the operating system may be different for at least one of the user devices.

The applications and services on the user device comprise one or more computer programs, software services, or routines, which may be supported by the operating system. For example and without limitation, the application may comprise an app installed by a user, such as a music-playing application, a video player, a virtual assistant, or a web browser. Some applications or services may be part of the operating system. For instance, services may include services or routines that are built into the operating system, such as (without limitation) configuration setters or determiners, user preferences setters or determiners, communications services, user interface services, or security services.

In some embodiments, an application or service may be utilized by a user to carry out or facilitate a task. For example, and without limitation, an application or service may be used for checking or reading email; other communication (e.g., instant messaging); playing music or video; reading or writing a document; browsing the Internet; browsing or engaging with a social media platform; navigation/geography; monitoring a weather forecast; calendar or scheduling; monitoring or altering the user's environment such as adjusting lighting, heating or cooling the air, or reducing humidity; operating a vehicle or machine; or other applications, services, or tasks carried out for the user.

It is also contemplated that a client user device may include more than one application or service for handling a particular task, such as more than one web browser, music player, or virtual assistant. In some instances, the applications or services may have user preferences, such as settings, which may be associated with carrying out a task or may be used for configuring the functionality of the application or service.

Data sources 104A and 104B through 104N may comprise data sources and/or data systems, which are configured to make data available to any of the various constituents of operating environment 100, or system 200 described in connection to FIG. 2. (For instance, in one embodiment, one or more data sources 104A through 104N provide (or make available for accessing) user data to user-data collection component 210 of FIG. 2.) Data sources 104A and 104B through 104N may be discrete from user devices 102A and 102B through 102N and server 106 or may be incorporated and/or integrated into at least one of those components. In one embodiment, one or more of data sources 104A through 104N comprise one or more sensors, which may be integrated into or associated with one or more of the user device(s) 102A, 102B, or 102N or server 106. Examples of sensed user data made available by data sources 104A through 104N are described further in connection to user-data collection component 210 of FIG. 2.

Figure 2:
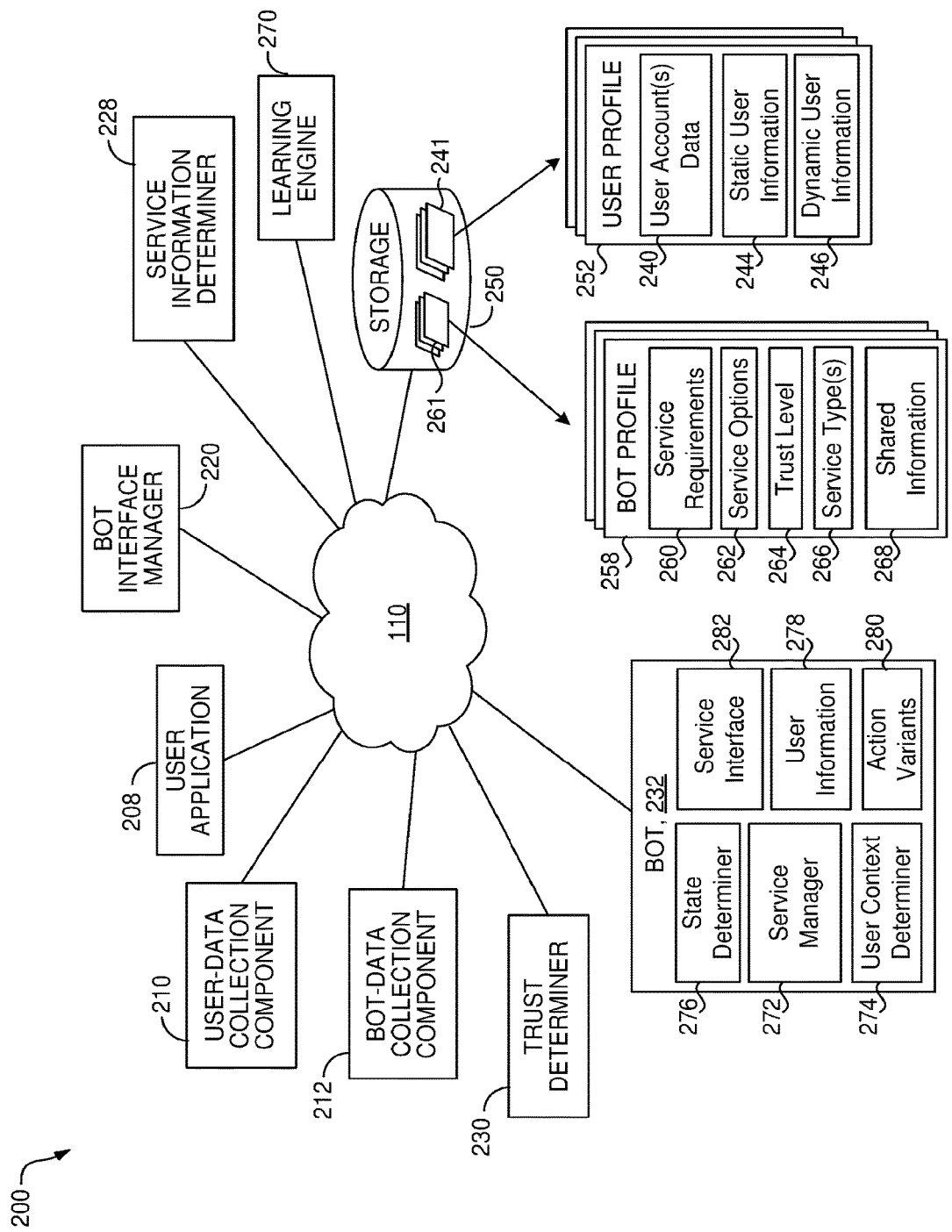
FIG. 2 is a diagram depicting an example computing architecture suitable for implementing aspects of the present disclosure.

Operating environment 100 can be utilized to implement one or more of the components of system 200, described in FIG. 2, including components for interfacing with bots, applications and/or services on user devices and/or servers. Operating environment 100 also can be utilized for implementing methods 300, 400, and 500 in FIGS. 3, 4, and 5 respectively.

Referring now to FIG. 2, with FIG. 1, a block diagram is provided showing aspects of an example computing system architecture suitable for implementing an embodiment of the disclosure and designated generally as system 200. System 200 represents only one example of a suitable computing system architecture. Other arrangements and elements can be used in addition to or instead of those shown, and some elements may be omitted altogether for the sake of clarity. Further, as with operating environment 100, many of the elements described herein are functional entities that may be implemented as discrete or distributed components or in conjunction with other components, and in any suitable combination and location.

Example system 200 includes network 110, which is described in connection to FIG. 1, and which communicatively couples components of system 200 including user application 208, user-data collection component 210, bot-data collection component 212, bot interface manager 220, trust determiner 230, storage 250, and bot 232. User application 208, user-data collection component 210, bot-data collection component 212, bot interface manager 220, trust determiner 230, and bot 232 may be embodied as a set of compiled computer instructions or functions, program modules, computer software services, or an arrangement of processes carried out on one or more computer systems, such as computing device 600 described in connection to FIG. 6, for example.

In some embodiments, at least some of the functions performed by components of system 200 are associated with one or more personal assistant applications, services, or routines. In particular, such applications, services, or routines may operate on one or more user devices (such as user device 102A), servers (such as server 106), may be distributed across one or more user devices and/or servers (e.g., may be at least partially implemented in the cloud).

Moreover, these components, functions performed by these components, or services carried out by these components may be implemented at appropriate abstraction layer(s), such as the operating system layer, application layer, hardware layer, or other abstraction layers of the computing system(s). Alternatively, or in addition, the functionality of these components and/or the embodiments described herein can be performed, at least in part, by one or more hardware logic components. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), or similar hardware logic systems or devices. Additionally, although functionality is described herein with regards to specific components shown in example system 200, it is contemplated that in some embodiments, functionality of these components can be shared or distributed across other components.

In general, storage 250 is configured to store computer instructions (e.g., software program instructions, routines, or services), and/or models used in implementations of the invention described herein. In some implementations, storage 250 also stores information or data received via the various components of system 200 and provides the various components of system 200 with access to that information or data. For example, storage 250 may store such information or data as user and/or bot data, descriptive information associated with any user data or bot data described with respect to user-data collection component 210 and bot-data collection component 212, user or bot interaction data, inferential data, crowd-sourced datasets, and individual-sourced datasets. In implementations, storage 250 comprises a data store (or computer data memory). Further, although depicted as a single data store component, storage 250 may be embodied as one or more data stores or may be in the cloud. Furthermore, at least some of the information referred to as being stored in storage 250 may at least partially be stored on a user device, as such one or more of user devices 102A through 102N.

As an overview of system 200, user-data collection component 210 is generally responsible for collecting and optionally processing user data to thereby make information based on user data available to system 200. Bot-data collection component 212 is generally responsible for collecting and optionally processing bot data to thereby make information based on bot data available to system 200. User data refers to data corresponding to a user, such as descriptive information about a user and/or data generated by or in response to a user action or interaction with a computing device and/or software. Similarly, bot data refers to data corresponding to a bot, such as descriptive information about a bot and/or data generated by or in response to a bot action or interaction with a computing device and/or other software. The bot data and user data can be utilized by any of the various components of system 200. In some cases, learning engine 270 is employed to analyze and/or interpret bot data and user data to generate additional bot data and/or user data from the data and/or to support determinations made by the components of system 200.

Bot interface manager 220 is generally configured to manage interfaces with bots, such as bot 232. For example, these interfaces can facilitate interactions and/or information exchanges with bots. As an example, bot interface manager 220 can manage or facilitate an interface or interaction between bot 232 and user application 208, which can be another bot or other application or service associated with one or more users (e.g., used by a user or acting on behalf of a user). As another example, bot interface manager 220 can manage or facilitate an interface or interaction between bot 232 and a user that does not involve user application 208 (e.g., a direct user session with bot 232). These interactions can be managed to share user information with the bot to facilitate the bot performing one or more automated tasks on behalf of a user. Typically, the user information is shared for a particular transaction or task, such as the bot booking a hotel, ordering a pizza, providing customer support, and the like.

In some cases, prior to providing user information to a bot, bot interface manager 220 verifies that an entity is in fact a bot. For example, where a user is interacting with bot 232 or initiating a user session or other interaction with bot 232, bot interface manager 220 can determine whether bot 232 is actually a bot, and not for example, a conversational interface operated by another user. In other words, the user could be communicating with another person, and not a bot. This could include bot interface manager 220 analyzing a URI, domain, bot identifier, bot profile, messages provided by bot 232 in a user interface or otherwise, or other bot data associated with the bot.

Bot 232 is provided as an example of a suitable bot and includes state determiner 276, service manager 272, user context determiner 274, service interface 282, user information 278, and action variants 280. Where user application 208 is also a bot, it may include similar or different components it uses during interactions with bot 232. For example, its state determiner 276 could select states based on information provided by bot 232 and/or a user of a user session with the bot.

Service manager 272 is responsible for managing user sessions for performing automated tasks on behalf of users. Service manager 272 can use state determiner 276 to tracking states of a user session. Service manager 272 can also user service interface 282 to send communications to and receive communications from a user and/or computing entity in a user session. This can employ any suitable interfaces, such as conversational or non-conversational interfaces. Service manager 272 can receive user information 278 over the interfaces, and may employ user context determiner 274 to determine the context of the user for a user session from the user information. Service manager 272 can also select between action variants 280 based on the state of the user session and/or user information 278 (e.g., user context).

Action variants can refer to pre-determined variations for particular actions that may be taken by bot 232. For example, bot 232 could have two versions of the same dialogue sequence. Service manager 272 can select from variants of a particular action based on user context and/or preferences. For example, one variant could be an abbreviated version of another dialogue sequence for users that prefer rapid transactions or are in a hurry. As another example, one could variant could be a vegetarian listing of a menu for users that prefer vegetarian food, another could be the full listing, yet another could be a gluten free listing. Thus, different variants for a particular action may include different subject matter for accomplishing the same action (e.g., receiving an order).

State determiner 276 can be used by bot 232 to determine a state of bot 232 in a user session. Bot 232 can include a plurality of states of a state-based conversational model, where each state defines messages for the bot to provide to the user to facilitate the performance of automated tasks. As an example, each state could correspond to a respective branch of a dialogue script. State determiner 276 may determine the state based on user information 278, which can be provided by a user and/or bot interface manager 220 in association with a user session. Bot 232 may typically enter a default state upon initiating a user session, but may instead enter a different state based on receiving user information (e.g., prior to initiating dialogue with the user). As an example, state determiner 276 may skip or avoid states used to obtain user information already provided to the bot. For example, if the bot has the user's name, state determiner 276 can refrain from using a dialogue sequence for obtaining the user's name. As a further example, state determiner 276 may enter a state corresponding to user context provided to the bot. For example, context indicating the user will be changing its order may result in a state being set for modifying an existing order. Thus, bot 232 can factor in bot user information such as the user's email address, home address, and name, but user context, such as that the user is in a particular location or venue, or is looking for a particular type of service to be performed or product to be provided.

In addition or instead, as indicated above, the user information can cause bot 232 to select from one or more action variants 280 for interaction with the user. This could include selecting an abbreviated version of a dialogue sequence to provide to the user (e.g., based on user context or a user preference indicating the user is in a hurry or does not prefer to listen to options).

Based on user information 278 from bot interface manager 220, bot 232 can provide relevant information to streamline completion of automated tasks on behalf of users. Additionally, service manager 272 can enforce constraints on sharing user information 278, where the constraints may be provided by bot interface manager 220 in association with the user information and/or user session. It is contemplated that bot 232 does not typically have access to user data from user-data collection component 210, such as in user profile 252. For example, bot 232 can be a third party application hosted on an external computing platform as other components in FIG. 2 without permissions to access storage 250. Thus, user information 278 can include a specific subset of user information captured by user-data collection component 210 for a particular user, and that subset is specifically provided to bot 232 by bot interface manager 220 for performance a particular automated task. User information 278 may be stored in a non-persistent manner and deleted upon completion of the user session, which optionally could be included as a constraint provided by bot interface manager 220.

Bot interface manager 220 may utilize information extracted and/or determined by user-data collection component 210 and/or bot-data collection component 212 (e.g., user data and/or bot data) to manage interfaces with bots on behalf of one or more users. For example, bot interface manager 220 may employ service information determiner 228 to determine what information to provide to one or more bots (e.g., bot 232) to facilitate the one or more bots performing an automated task for the one or more users. This service information may optionally be based on an indication of the trust and/or reliability of the one or more bots, which can be determined by trust determiner 230. In doing so, bot interface manager 220 can improve the security and privacy of information when interacting with bots, as well as improve the efficiency of computer resource utilization in interacting with bots.

In various embodiments, the information utilized by bot interface manager 220 and/or service information determiner 228 includes any combination of a trust level of a bot(s) (e.g., trust level 264), service options of the bot(s) (e.g., service options 262), service requirements of the bot(s) (e.g., service requirements 260), service type(s) of the bot(s) (e.g., service types 266), shared information already provided to the bot(s) (e.g., shared information 268), user account(s)/user activity data of the user(s) (e.g., user account(s) 240), user settings or preferences of the user(s), static user information of the user(s) (e.g., static user information 244), and dynamic user information of the user(s) (e.g., dynamic user information 246). Where any of the forgoing service parameters are unknown for a particular bot or not used, aggregated information from multiple bots could be used. For example, learning engine 270 can machine learn what information is typically needed to complete a particular automated task. In some cases, one or more of these service parameters may be provided by a bot, such as in response to a request provided by bot interface manager 220 to the bot and/or provided by a user in a session analyzed by bot interface manager 220. Bot interface manager 220 can optionally store this information in a bot profile of the bot for later use.

As mentioned above, user-data collection component 210 is generally responsible for collecting and optionally processing user data, and bot-data collection component 212 is generally responsible for collecting and optionally processing bot data (e.g., using learning engine 270) to thereby make information based on bot data available to system 200. User data and bot data may be received from a variety of sources where the data may be available in a variety of formats. For example, in some embodiments, user data and/or bot data received via these components may be determined via one or more sensors (such as sensors 103A and 107 of FIG. 1), which may be on or associated with one or more user devices (such as user device 102A), servers (such as server 106), and/or other computing devices. As used herein, a sensor may include a function, routine, component, or combination thereof for sensing, detecting, or otherwise obtaining information, such as user data or bot data, from a data source (e.g., data source 104A), and may be embodied as hardware, software, or both.

By way of example and not limitation, user data or bot data may include data that is sensed or determined from one or more sensors (referred to herein as sensor data), such as location information of mobile device(s), mobile-device data (such as device state, charging data, date/time, configurations or settings, or other information derived from a mobile device), user activity information (for example: app usage data; information regarding applications and services utilized or tasks performed on a user device and related contextual information such as usage time(s), files accessed, application configurations, and online activity; searches; voice data such as automatic speech recognition; activity logs; communications data including calls, texts, instant messages, and emails; website posts; other user data associated with communication events; other user interactions with a user device, or other user activity information) including user activity that occurs over more than one user device, user history, session logs, application data, contacts data, calendar and schedule data, notification data, social network data, news (including popular or trending items on search engines or social networks), online gaming data, ecommerce activity (including data from online accounts such as Microsoft®, Amazon.com®, Google®, eBay®, PayPal®, video-streaming services, gaming services, or Xbox Live®), user-account(s) data (which may include data from user preferences or settings associated with a personalization-related (e.g., "personal assistant" or "virtual assistant") application or service), home-sensor data, appliance data, global positioning system (GPS) data, vehicle signal data, traffic data, weather data (including forecasts), wearable device data, other user device data (which may include device settings, profiles, network-related information (e.g., network name or ID, domain information, workgroup information, other network connection data, Wi-Fi network data, or configuration data, data regarding the model number, firmware, or equipment, device pairings, such as where a user has a mobile phone paired with a Bluetooth headset, for example, or other network-related information)), gyroscope data, accelerometer data, payment or credit card usage data (which may include information from a user's PayPal account), purchase history data (such as information from a user's Xbox Live, Amazon.com or eBay account), other sensor data that may be sensed or otherwise detected by a sensor (or other detector) component(s) including data derived from a sensor component associated with the user (including location, motion, orientation, position, user-access, user activity, network-access, user-device-charging, or other data that is capable of being provided by one or more sensor components), data derived based on other data (for example, location data that can be derived from Wi-Fi, cellular network, or IP address data), and nearly any other source of data that may be sensed or determined as described herein.

User data, particularly corresponding to contextual or personal information, can be received by user-data collection component 210 from one or more sensors and/or computing devices associated with a user. It is intended that the accumulation of user data embody robust privacy and data protection for individuals, businesses and public-sector organizations. In this respect, users are given control over many aspects related to user data including the ability to opt in or opt out of data collection and/or any of the various tracking or analysis features described herein. Furthermore, safeguards are to be implemented to protect sensitive user data from access by other parties, including other users, without express consent of the user. Additionally, any user data is intended to be made anonymous, when possible.

While it is contemplated that the user data and bot data is processed by various computing components, for interpretability by user-data collection component 210 and bot-data collection component 212, embodiments described herein do not limit the user data and bot data to processed data and may include raw data.

In some respects, user data may be provided in user-data streams or signals. A "user signal" can be a feed or stream of user data from a corresponding data source. For instance, a user signal could be from a smartphone, a home-sensor device, a GPS device (e.g., for location coordinates), a vehicle-sensor device, a wearable device, a user device, a gyroscope sensor, an accelerometer sensor, a calendar service, an email account, a credit card account, or other data source. In some embodiments, user-data collection component 210 receives or accesses user-related data continuously, periodically, or as needed.

At least some of the user data pertaining to a user that is collected by user-data collection component 210 can be stored in and accessed from a user profile associated with that user. This information can include, for example, user account(s) data 240, static user information 244, and dynamic user information 246 of user profile 252 of a particular user.

User account(s) data 240 generally includes user data collected from user-data collection component 210 (which in some cases may include crowd-sourced data that is relevant to the particular user), and may be used for accessing content corresponding to a task (e.g., a user's email account information and credentials enabling an email message to be accessed, identified, and loaded into a second user session), or may be used for determining context data about the user (e.g., user behavior patterns). User account(s) data 240 may include data associated with user accounts, such as online accounts (e.g. email, social media), Microsoft® Net passport, user data relating to user accounts such as user emails, texts, instant messages, calls, and other communications; social network accounts and data, such as news feeds; online activity; and calendars, appointments, application data, or the like. Some embodiments of user account(s) data 240 may store information across one or more databases, knowledge graphs, or data structures. In various implementations, user-data collection component 210 can utilize user account(s) data 240 to access user data of a particular user and/or associate data with the particular user. For example, by identifying a user's e-mail address of user account(s) data 240 in a field of an e-mail, user-data collection component 210 could identify the body, attachments, and/or other information of the message or information derived therefrom as user data of the user.

Static user information 244 generally includes user data collected from user-data collection component 210 (which in some cases may include crowd-sourced data that is relevant to the particular user, or may be used to generate crowd-sourced data) that is static in nature. Dynamic user information 246 generally includes user data collected from user-data collection component 210 (which in some cases may include crowd-sourced data that is relevant to the particular user, or may be used to generate crowd-sourced data) that is dynamic in nature. Static user information may refer to persistent data, which denotes information that is unlikely to be modified, or is rarely modified. Dynamic user information may refer to non-persistent data, which denotes information that is likely to be modified, or is often modified. Dynamic user information may refer to dynamic data or transactional data in which the data may be updated at any time (e.g., asynchronously), with potential periods of inactivity in between.

Examples of static user information include demographic information, such as a user's age, gender, date of birth. Other examples of static user information include user preferences and/or settings. User settings may refer to configurations that are explicitly selected by a user, such as using graphical user interface (GUI) options, form fields, sliders, and the like. User settings can include user requirements of a user or user preferences of the user.

User preferences may optionally be inferred from user activity data, such as using learning engine 270. As an example, through a user's historical interactions with one or more user applications, such as user application 208, user-data collection component 210 can learn or infer what types of food the user typically orders, whether the user likes to hear all of their options when ordering from a store or prefers abbreviated listings or transactions, what types of places the user likes to visit on vacations, and the like. While this information can change, it is characterized by its static and stable nature (given sufficient supporting data). For example, a user preference may be based on many instances of a user exhibiting the user preference. The instances can be identified and detected by user-data collection component 210, applied to learning engine 270 to be captured in one or more machine learning models (e.g., stored in storage 250). Thus, a single conflicting instance typically would not be sufficient to change the user preference (e.g., absent the passage of a significant period of time between instances, explicit user information, or the like).

Dynamic user information may comprise current contextual information of a user (e.g., information that is descriptive of the user's current context or condition). Examples of dynamic user information include a user's current (recent) location, a user's current venue, a transitory current state of the user, such as a categorization or representation of the user's state of mind, mood, or physical condition, current user activity being engaged in, user activity recently engaged in within a previous period of time (e.g., in the past day or hour), recent purchases made by the user, characteristics or features of recent transactions made by the user or participated in on behalf of or by the user (e.g., in bot interactions and/or with user application 208 to complete one or more automated tasks), and more.

In some implementations, user-data collection component 210 determines static user information and/or dynamic user information by monitoring user data and/or bot data for information that may be used for determining user activity information, and determines the static user information and/or dynamic user information based on the user activity information (e.g., using learning engine 270 as indicated above). This can include identifying and/or tracking features (sometimes referred to herein as "variables") or other information regarding specific user actions and related contextual information. In some embodiments, the user activity information can be utilized by bot interface manager 220 to determine whether one or more trigger events have occurred. The trigger events can be for providing user information of a user to a bot to facilitate the bot performing an automated task on behalf of the user. Examples of trigger events are described throughout the application and include a bot initiating a user session with a bot and/or requesting performance of an automated task.

Embodiments of user-data collection component 210 may determine, from the monitored user data, user activity associated with a particular user. The user activity information determined by user-data collection component 210 may include user activity information from multiple user devices associated with the user and/or from cloud-based services associated with the user (such as email, calendars, social-media, or similar information sources), and which may include contextual information associated with the identified user activity. As indicated above, user-data collection component 210 may determine current or near real-time user activity information and may also determine historical user activity information, which may be determined based on gathering observations of user activity (e.g., instances) over time, and accessing user logs of past activity (such as browsing history, for example). Further, in some embodiments, user-data collection component 210 may determine user activity (which may include historical activity) from other similar users (i.e., crowdsourcing), as described previously. This can be used by learning engine 270 to infer user preferences of a user from those learning engine 270 determined from patterns of user activity of user's learning engine 270 determined were similar to the user.

In some embodiments, user-data collection component 210 employs one or more applications or services which analyze information detected via one or more user devices used by the user and/or cloud-based services associated with the user to determine user activity information and related contextual information. Information about user devices associated with a user may be determined from the user data made available via user-data collection component 210, and may be stored in in user account(s) data 240 and/or used to detect, monitor, and identify user activity in association with the particular user.

Some embodiments of user-data collection component 210, or its subcomponents, may determine a device name or identification (device ID) for each device associated with a user. This information about the identified user devices associated with a user may be stored in a user profile associated with the user, such as in user account(s) data 240 of user profile 252. In an embodiment, the user devices may be polled, interrogated, or otherwise analyzed to determine information about the devices. This information may be used for determining a label or identification of the device (e.g., a device ID) so that user interaction with the device may be recognized from user data by user-data collection component 210 (e.g., in association with the user). In some embodiments, users may declare or register a device, such as by logging into an account via the device, installing an application on the device, connecting to an online service that interrogates the device, or otherwise providing information about the device to an application or service. In some embodiments, devices that sign into an account associated with the user, such as a Microsoft® account or Net Passport, email account, social network, or the like, are identified and determined to be associated with the user.

As indicated above, user-data collection component 210 may comprise a user activity detector or identifier and other subcomponents such as a user activity contextual information extractor. In some embodiments, user-data collection component 210 may determine interpretive data from received user data (e.g., using learning engine 270). Interpretive data corresponds to data utilized by the components of system 200 or subcomponents thereof to interpret user data. For example, interpretive data can be used to provide determine user context from user data, which can support determinations or inferences made by the components or subcomponents.

User-data collection component 210 may receive user data, parse the data, in some instances, and identify and extract context features or variables to generate context data and other contextual information associated with users. In some embodiments, user-data collection component 210 extracts information via screen scraping (or screen grabbing), keylogging, scanning memory, monitoring or analysis of operating system activity, monitoring and analyzing GPS data, and/or scanning communication(s). In some embodiments, optical character recognition may be utilized. In some embodiments, semantic analysis may be performed, which may use a semantic knowledge base. As another example, the information may be provided by a user application, such as user application 208.

In some embodiments, the context data features or variables are stored as a related set of contextual information associated with a user session or task being carried out via user application 208, bot 232, and/or a user device of a user (e.g., user device 102A). In some embodiments, user-data collection component 210 determines interpretive data from received user data to infer user context. The context data extracted or otherwise determined by user-data collection component 210 may be provided to storage 250, where it may be stored in a user profile 252, to facilitate the sharing of the context data across applications and services.

Context data may be determined by user-data collection component 210 and stored continuously (e.g., as it changes during a user session); periodically; according to user settings; based on a determined likelihood that the user is about to (or has) started using bot 232; or as needed. In some embodiments, context data may include a timestamp (or value) used to determine the most recent context data, as well as an indication of the staleness of the context data. The staleness may be useful where a significant amount of time has passed. In such a circumstance, bot interface manager 220 and/or service information determiner 228 may determine that the context could have changed but was not preserved, and thus refrain from providing the context as shared user information or other otherwise using the context.

Thus, as indicated above, it is contemplated that embodiments of user-data collection component 210, its subcomponents, and other components of system 200 (e.g., bot-data collection component 212, trust determiner 230, bot interface manager 220, service information determiner 228, and user application 208) may use user data and/or bot data to derive interpretive data for carrying out the objectives of the components described herein. Additionally, many variations of user activity identification and user activity monitoring are possible in various embodiments of the disclosure.

In some implementations, user-data collection component 210 infers one or more user activity patterns based on monitoring the user activity. User-data collection component 210 may determine current user activity or one or more historical user actions or activities. Some embodiments of user-data collection component 210 monitor user data for activity-related features or variables corresponding to user activity such as indications of applications launched or accessed, files accessed, modified, copied, websites navigated to, online content downloaded and rendered or played, or similar user activities.

Additionally, as indicated above, user-data collection component 210 can extract from the user data information about user activity, which may include current user activity, historical user activity, and/or related information such as contextual information of the user activity and/or user. Alternatively or in addition, in some embodiments, user-data collection component 210 determines and extracts user activity contextual information. Examples of extracted user activity information may include app usage, online activity, searches, calls, usage duration, application data (e.g., emails, messages, posts, user status, notifications, or similar data), or nearly any other data related to user interactions with the user device or user activity via a user device.

The extracted user activity information determined by user-data collection component 210 may be provided to other components of system 200. Further, the extracted user activity may be stored in a user profile associated with the user, such as in user profile 252, as discussed above. In some embodiments, user-data collection component 210 performs conflation on the detected user activity information. For example, overlapping information may be merged and duplicated or redundant information eliminated.

In some embodiments, information received by user-data collection component 210 may be used to generate, update, and/or train any of the various data models discussed herein, including a user preference model (e.g., used to determine a user preference, such as has been described above). The functionalities and/or operations of user-data collection component 210 may be enabled via user activity logic. In some embodiments, user-data collection component 210 can employs user activity event logic, which may include rules, conditions, associations, classification models, or other criteria. The activity event logic can take many different forms depending on the mechanism used to identify an activity event. For example, the user activity event logic could be training data used to train a neural network that is used to evaluate user data to determine when an activity event has occurred. The activity event logic may comprise fuzzy logic, neural network, finite state machine, support vector machine, logistic regression, clustering, or machine-learning techniques, similar statistical classification processes, or combinations of these to identify activity events from user data. For example, activity event logic may specify types of user device interaction information that are associated with an activity event, such as navigating to a website, composing an email, or launching an app. In some embodiments, a series or sequence of user device interactions may be mapped to an activity event, such that the activity event may be detected upon determining that the user data indicates the series or sequence of user interactions has been carried out by the user.

In some embodiments, user-data collection component 210 runs at least partially on or in association with each of a plurality of devices user devices for a user. User-data collection component 210 may include functionality that polls or analyzes aspects of the operating system to determine user activity related features (such as installed or running applications or file accesses and modifications, for example), network communications, and/or other user actions detectable via the user device including sequences of actions.

In some embodiments, user-data collection component 210 includes subcomponents comprising an app activity logging pipeline and a browse activity logging pipeline. These logging pipelines may be embodied as client-side applications or services that run on each user device associated with a user, and in some embodiments may run in conjunction with applications or inside (or as a part of) applications, such as within a browser or as a browser plug-in or extension. An example of such an application may include user application 208 and/or bot interface manager 220.

The app activity logging pipeline, in general, manages logging of a user's application (or app) activity, such as application download, launch, access, use (which may include duration), file access via the application, and in-application user activity (which may include application content). The browse activity logging pipeline, in general, manages logging of a user's browse activity, such as websites visited, social media activity (which may include browse-type activity conducted via specific browsers or apps like the Facebook® app, Twitter® app, Instagram® app, Pinterest® app, or similar apps.), content downloaded, files accessed, and other browse-related user activity. In some embodiments, each browser on a user device is associated with an instance of browse activity logging pipeline, or alternatively a plug-in or service that provided browse information to a single instance of browse activity logging pipeline on the user device. In some embodiments, app and browse activity logging pipelines may also perform functionality such as logging time stamps, location stamps, user-device related information, or other contextual information that is associated with the logged app activity or browse activity. In some embodiments, app and browse activity logging pipelines upload logged user activity information to learning engine 270 and/or store the logged activity information in a user profile associated with the user, such as in user profile 252.

User-data collection component 210 may use an activity pattern inference engine included in learning engine 270 to determine user activity patterns based on the user activity information and user data. In some embodiments, the activity pattern inference engine may run on a server, as a distributed application across multiple devices, or in the cloud. At a high level, the activity pattern inference engine may receive user activity-related information, which may be uploaded from user activity logs from client-side applications or services associated with user-data collection component 210. One or more inference algorithms may be applied to the user activity-related information to determine a set of likely user activity patterns. For example, patterns may be determined based on similar instances of observation of user activity or associated contextual information, which may be referred to as "in-common features" of user activity-related information. The inferred activity pattern information may be provided to learning engine 270 and/or used to generate, update, and/or train the various data models discussed herein, including user preference models.

In some embodiments, a corresponding confidence is also determined for the patterns, as described herein. Further, the activity pattern may comprise a single user activity likely to occur, or a sequence of user actions, or probabilities for more than one future action, for example, an eighty percent likelihood that the next action will be browsing to website A and a fifteen percent likelihood that the next action will be launching a music player application, and a five percent likelihood that the next action will be browsing to website B.

In some embodiments, user activity patterns may be determined by monitoring one or more activity features, as described previously. These monitored activity features may be determined from the user data described previously as tracked variables or as described in connection to user-data collection component 210. In some cases, the variables can represent context similarities and/or semantic similarities among multiple user actions (activity events). In this way, user activity patterns may be identified by detecting variables or features in common over multiple user actions. More specifically, features associated with a first user action may be correlated with features of a second user action to determine a likely pattern. An identified feature pattern may become stronger (i.e., more likely or more predictable) the more often the user activity observations that make up the pattern are repeated. Similarly, specific features can become more strongly associated with a user activity pattern as they are repeated.

Thus, from the forgoing, it should be appreciated that any of the various static user information 244 and dynamic user information 246 can be inferred using the various data models described above that are based on detected user activity. For example, as described above, where there is an eighty percent likelihood that the next action will be browsing to website A, user-data collection component 210 can infer the current user context that the user is web browsing based on that likelihood. In some cases, one or more user preference models may be used to probabilistically predict and/or infer the user's interests and/or preferences. Using these models, for each of a plurality of categories, a normalized preference score or weight for the user's interest in or preference for the category may be determined. The preference score may indicate a probabilistic correlation between the user's preferences and the category. Further, bot interface manager 220 can utilize one or more such scores and/or other user data to determine (e.g., infer) whether a trigger event has occurred for providing user information to a bot.

At least some of the bot data pertaining to a bot that is collected and/or determined by bot-data collection component 212 (e.g., using learning engine 270) can be stored in a bot profile associated with that bot. This information can include, for example, service requirements 260, service options 262, trust level 264, service type(s) 266, and shared information 268, optionally stored in bot profile 258. Bot profile 258 can correspond to a particular bot, such as bot 232 by way of example, or multiple bots. Service requirements, service options, and service types, are types of service parameters, which can be used to determine content to share with bots.

Service type(s) 266 generally refers to information that represents what type or types of services are provided by the bot. For example, Service types 266 can include a list of tasks that can be performed by the bot. This can include, for example, booking a flight, providing customer information or support, purchasing a movie ticket, purchasing a product, playing a media file such as a song or movie, setting an alarm, providing a weather report, providing information on a particular subject, and more. However, service types 266 can be more general, such as travel or leisure, for example. In some embodiments, service types 266 comprise categories, which are assigned to different bots depending upon the tasks they are capable of performing. For example, a category model may be used to classify tasks various bots can perform. In some cases, the category model could be hierarchical with varying levels of specificity. For example, a book a flight category could be under a travel category.

Service requirements 260 generally refers to what information is required by the bot to accomplish one or more automated tasks on behalf of a user. For example, in order for bot 232 to book a flight on behalf of a user, the bot may require various information, such as the full legal name of the user, payment details, departure date, return date, and the like. Different bots may have different requirements for the same task, or the same bot may be capable of performing different tasks with different information requirements. For example, to purchase a movie ticket, a bot may not require a user's name, but not necessarily the full legal name. Where a bot is capable of performing multiple tasks, service requirements 260 may record which tasks require what information. In some cases, each service type 266 may be associated with a set of service requirements 260 (e.g., a different set).

Trust level 264 generally refers to a level of trust and/or reliability of the bot. Trust level 264 can comprise a trust or reliability score associated with the bot. Trust level 264 could be captured as a degree of trust, or as a binary value, as some examples. Trust level 264 could be based on various criteria, which may be used to determine the trust score. Trust level 264 may be determined by trust determiner 230, which will later be described in further detail.

Shared information 268 generally refers to a record or log of information (e.g., user information) that was shared with the bot. In some cases, entries in the log may be time stamped based on when corresponding information was shared with the bot. In various implementations, shared information can comprise static user information and/or dynamic user information, such as static user information 244 and dynamic user information 246. As an example, an entry in a log of shared information 268 could point to or otherwise reference an entry in static user information 244 or dynamic user information 246.

In some embodiments, shared information 268 captures information shared with the bot by bot interface manager 220. Bot interface manager 220 may share the information in a variety of possible ways. In some cases, bot interface manager 220 shares the information with the bot, which will be referred to as bot 232 by way of example (but could be a different bot), by transmitting the information to the bot. For example, the information may be transmitted by bot interface manager 220 in one or more network communications, which may be provided to bot 232 over network 110. In addition or instead, bot interface manager 220 may provide, over the one or more network communications, access information, which bot 232 or a service acting on behalf of the bot can then utilize to access the shared information. Examples of access information include an encryption key, login credentials, and the like. In addition or instead, bot interface manager 220 may transmit an authorization to a storage system, such as storage 250, to enable bot 232 to access the shared information. Any combination of these approaches may generally be referred to as bot interface manager 220 providing the shared information to bot 232.

Bot interface manager 220 may provide the shared information to bot 232 to facilitate a user session with the bot. For example, the information may be provided to facilitate and/or enable bot 232 to perform an automated task on behalf of one or more users. In accordance with various embodiments, a user session with a bot can include various types of interactions with the bot both from the user and from bot interface manager 220.

In various embodiments, an interaction with a bot can be a direct user interaction. In a "direct user interaction" with a bot, the user communicates information directly to the bot via a user interface of the bot (for example and without limitation, a chat window, a voice interface, or a similar interface). This is a typical means for interacting with a bot that is often found on websites. An "indirect user interaction" with a bot refers to an interaction in which a different application or service, such as bot interface manager 220 provides the user communication to the bot (e.g., bot 232), optionally after service information determiner 228 edits, reformats, changes the scope of, or removes information from the message.

For example, in an indirect user interaction, the user may communicate to the bot through user application 208 (e.g., via a user interface that is not associated with the bot but is associated with the different application or service), which may be a different bot, application, and/or virtual assistant. Bot interface manager 220 can then provide that communication to bot 232. For example, bot interface manager 220 could be part of user application 208 or an intermediate application or service. Bot interface manager 220 may provide the communication to bot 232 via the user interface of bot 232 (e.g., GUI) and/or a back end interface.

An "automated interaction" with a bot refers to an interaction with the bot in which a computing entity (e.g., service information determiner 228) provides the communication to the bot, as opposed to the user. For example, a user may communicate a request for user application 208 to complete an automated task, and bot interface manager 220 may determine communication(s) for automated interactions required to complete the automated task. This could include service information determiner 228 causing user application 208 to request user information from the user as needed for the communications, and/or service information determiner 228 accessing the user information in user profile 252 or otherwise determining the user information from user data.

As an example, in some embodiments, bot 232 is hosted on a website the user navigates to and bot interface manager 220 is a service associated with the web browser and/or operating system being used by the user. Bot interface manager 220 can facilitate a user session with bot 232 in which the user employs direct user interaction by sharing user information with bot 232. The user information could be shared at any suitable time, such as by communicating portions of shared information 268 to bot 232. Bot 232 can then utilize the shared information in the user session.

In some embodiments, bot interface manager 220 detects or otherwise determine one or more trigger events have been satisfied in order to share the user information. This could be based on bot interface manager 220 detecting loading of bot 232. For example, the information could be provided to bot 232 based on the detected loading prior to bot 232 prompting the user and/or the user communicating with the bot (e.g., prior to bot 232 initiating the user session). In addition or instead, bot interface manager 220 could monitor communications from bot 232 and/or the user in the user interface of bot 232 to determine whether to provide at least some user information to bot 232.

As an example of the foregoing, bot interface manager 220 could employ natural language processing or other text analysis to text of the user interface. This could include bot interface manager 220 determining bot 232 has requested information from the user (e.g., based on identifying a question, prompt, and/or information request in the user interface). Optionally based on detecting the prompt for information, bot interface manager 220 could present a prompt/option to the user to allow the user to selectably permit or deny bot interface manager 220 from providing the information to bot 232.

As another example, in some embodiments, the user interacts with user application 208, which could be another bot that is hosted on and/or part of an operating system being used by the user. For example, user application 208 could be another bot (e.g., a virtual assistant bot). The user can interact with user application 208 through a user interface of user application 208, and bot interface manager 220 can be employed to facilitate a session between user application 208 and bot 232 on behalf of the user. This may be referred to as a bot-bot session, or application-application session in which user application 208 employs automated interactions and/or indirect user interactions with bot 232 to share user information with bot 232. Optionally, one or more direct user communications with bot 232 could be employed. The user information could be shared at any suitable time, such as by communicating portions of shared information 268 to bot 232. Bot 232 can then utilize the shared information to facilitate performance of the automated task on behalf of the user.

In various embodiments, bot interface manager 220 can share user information with bots based on any of the various preferences (e.g., user settings) described herein, which may be stored in user profile 252. In addition or instead, bot interface manager 220 can share user information with bots based on personal and/or previous behavior and/or dynamic or static rules. Examples of these factors are described throughout and includes trust levels, described below, which may be incorporated into the rules. Where the factors are based on user preferences, they may change over time to be tuned to the user's previous activity (e.g., using machine learning) and/or user settings.

In some cases, these factors are used by bot interface manager 220 to determine if user information can be passed to a bot without any approval (e.g., explicit approval, which may be given any time in advance or in a particular transaction). In addition or instead, these factors can be used by bot interface manager 220 to determine if user information can be passed to a bot without any providing any notification or alert to the user, either in advance or after sharing the information. Herein, a notification can be provided using any suitable means, such as by transmitting a message, text, pop-up, email, push notification, and the like. In some cases, the notification is provided to an interface of user application 208.

In various implementations, service information determiner 228 may determine the content of the information to share with bot 232 from the text of one or more user interfaces (e.g., of bot 232 an/or user application 208), such as by identifying keywords from the text and mapping the keywords to the information. In some embodiments, service information determiner 228 maps the communications between the user and/or bot 232 to service requirements 260 and/or service types 266 and users service requirements 260 and/or service types 266 to determine information to share from static user information 244 and/or dynamic user information 246.

Optionally, the content of a message or communication and/or the format of the message could be altered by service information determiner 228, or the content and format of the message could be provided as is (e.g., in natural language). Service information determiner 228 may alter the content of the message, for example, to enhance the security and/or privacy of the user. For example, service information determiner 228 could remove information from content that it determines is not needed to complete the automated task and/or it determines bot 232 is not trustworthy enough to receive (based on trust level 264). As another example, service information determiner 228 could make the content less specific based on the trust level and/or service parameters for completing the automated task. As a further example, service information determiner 228 could tokenize the content (before or after making other modifications) to enhance the security of the information. Tokenizing content can include substituting a sensitive content element with a non-sensitive equivalent, referred to as a token, that has no extrinsic or exploitable meaning or value. The token can be a reference identifier) that maps back to the sensitive data through a tokenization system.

Thus, bot interface manager 220 in conjunction with service information determiner 228 can control or manage access to the user's data (including context data) which may be provided by the user (e.g., in a user interface of a bot) and/or stored in a user profile. As indicated above, this can be based on the information described with respect to bot profile 258 and/or user profile 252. For example, bot interface manager 220 can use a trust level to determine whether to engage with bot 232 for performance of an automated task and/or whether to share the user information with bot 232. Bot interface manager 220 may disfavor or avoid bots with lower trust levels when selecting a bot to perform an automated task or determining whether to share user information with the bot.

In addition or instead, service information determiner 228 can use trust levels to determine content of user information to share with a bot. The content may be less specific for a bot with a lower trust level or certain content may not be shared. For example, a bot with a higher trust level may be provided a user's age, whereas a bot with a lower trust level may be provided with an age range (e.g., over 18). As another example, user information could be revealed gradually, with specificity increasing as needed by the bot to complete an automated task.

In some cases, service information determiner 228 generates less specific user information from more specific user information, and provides that less specific user information to bot 232 based on the trust level and/or other factors described herein, such as service parameters for completing the task. For example, the more specific user information may be accessed from the user's user profile (e.g., user profile 252), then generalized and/or anonymized to generate content to be provided to bot 232.

Trust levels may be employed by service information determiner 228 and/or bot interface manager 220 using one or more thresholds. For example, if a trust level is below a threshold, the user information may not be shared requiring the user to manually provide the user information to bot 232, causing a warning to be presented to the user, and/or causing a request for permission to share the user information to be presented to the user. As another example, if a trust level is below a threshold, the user information provided to bot 232 at a lower level of specificity. In some embodiments, different thresholds can be used to determine which information to share with bot 232 and/or different potential levels of specificity for that information. In one threshold range, only non-sensitive user information might be shared with bot 232. More sensitive information may require a higher threshold range to be shared or permission or authorization from the user. A social security number, for example, may require that bot 232 is from a trusted publisher and that the social security number is required for completion of the automated task to be performed by bot 232 (e.g., as indicated by service parameters for the task).

Service information determiner 228 and/or bot interface manager 220 may use a trust level and/or service parameters to limit the user information provided to a bot at different times. For example, user application 208 may aggregate offers on performing automated tasks from various bots and provide the information needed to provide those offers. When the user indicates interest in one or more of the offers (e.g., selects an offer), or an offer is otherwise selected (e.g., an offer(s) could be automatically selected based on criteria such as lowest price), additional user information can be provided required to complete the automated task corresponding to the offer. Thus, a user name, and other personal information may be provided to bots on a need to know basis according to service parameters for completing the automated task.

Trust determiner 230 can determine trust levels of bots in various ways. In some cases, trust determiner 230 determines a trust level for a bot by accessing that predetermined trust levels stored in an associated bot profile. For example, service information determiner 228 and/or bot interface manager 220 may specify a bot and trust determiner 230 can provide the trust level to the requesting component.

In some implementations, trust determiner 230 can determine a trust level of a bot by analyzing bot data and/or user data. A factor trust determiner 230 could base a trust level for a bot on is one or more previous interactions with the bot. The one or more previous interactions could include bot interface manager 220 providing the bot with user information. Trust determiner 230 could base a trust level of the bot on determining whether the bot shared the user information with an undesirable or unauthorized party, such as a computing entity. This may be determined, for example, by accessing shared information 268. In some cases, trust determiner 230 bases a trust level of the bot on whether the bot complied with constraints or rules provided to the bot for the sharing of the user information.

Determinations made by trust determiner 230 could be facilitated, for example, by using and analyzing a blockchain. The blockchain could include a growing list of records, called blocks, which are linked and secured using cryptography. Each block may include a hash pointer as a link to a previous block, a timestamp, and transaction data capturing various information, such as user information shared in a transaction, constraints on sharing the user information, sending and/or receiving party identifiers of the user information, and more. The blockchain can serve as an open, distributed ledger that can record transactions between bots and/or applications or services in which user information is exchanged. In some cases, system 200 could monitor the ledger, and transmit or otherwise provide a notification to a user based on determining from the ledger that the user's information was shared.

Other factors trust determiner 230 could base a trust level on a bot may include service type 266, service options 262, service requirements 260, previous interactions with one or more bots similar to the bot (e.g., having a similar bot profile), entities or organizations associated with the bot, a web domain of the bot, a hosting service of the bot, a website hosting the bot, a URI of the bot, user ratings of the bot, and more.

Figure 3:
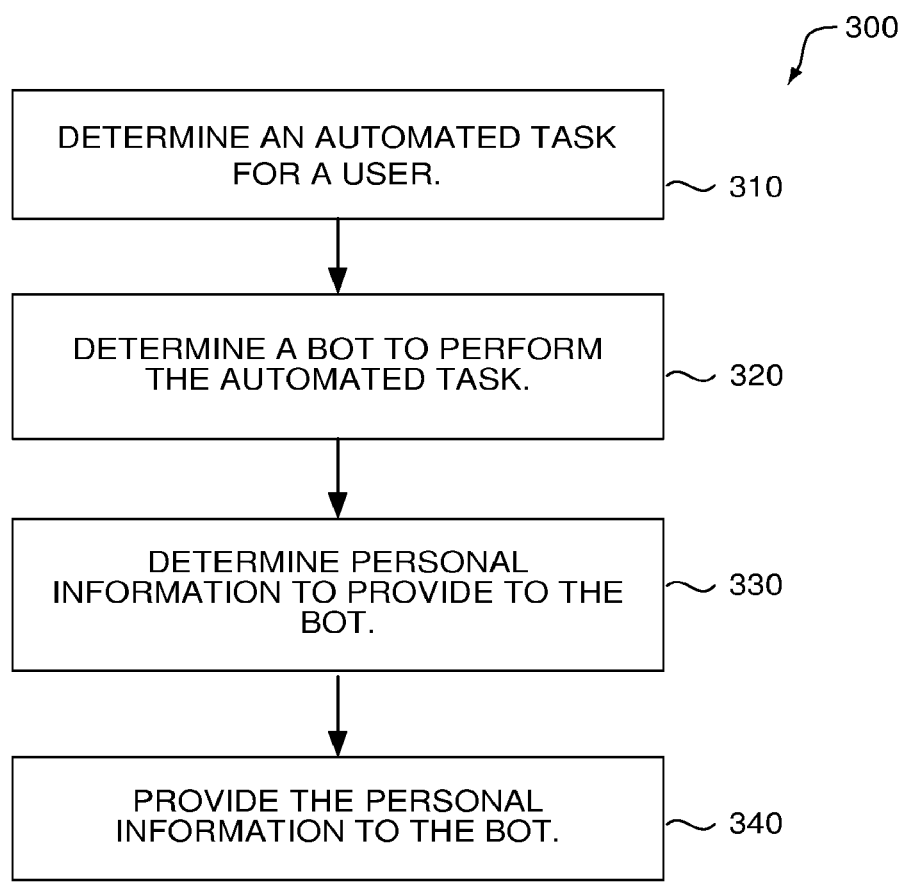
FIG. 3 depicts a flow diagram of a method for sharing user information with bots, in accordance with embodiments of the present disclosure.

Referring now to FIG. 3, a flow diagram is provided showing an embodiment of a method 300 for sharing user information with bots. Each block of method 300 and other methods described herein comprises a computing process that may be performed using any combination of hardware, firmware, and/or software. For instance, various functions may be carried out by a processor executing instructions stored in memory. The methods may also be embodied as computer-usable instructions stored on computer storage media. The methods may be provided by a standalone application, a service or hosted service (standalone or in combination with another hosted service), or a plug-in to another product, to name a few.

At block 310, method 300 includes determining an automated task for a user. For example, bot interface manager 220 can determine an automated task to be performed on behalf of a user by analyzing user data from user-data collection component 210. In some implementations, bot interface manager 220 is part of user application 208. Further, bot interface manager 220 may determine the automated task by analyzing at least one user message provided to a user interface (e.g., GUI) of user application 208, which may be a bot.

At block 320, method 300 includes determining a bot to perform the automated task. For example, bot interface manager 220 can determine bot 232 to perform the automated task. This can include bot interface manager 220 determining bot 232 is capable of performing the automated task on behalf of the user. As an example, bot interface manager 220 could select bot 232 from bot profiles 262 based on its bot profile indicating it is capable of performing the automated task (e.g., as indicated by service types 266). Bot interface manager 220 may also consider other information it selecting amongst potential bots, such as trust level 264. For example, bot interface manager 220 may favor bots with higher trust levels and could exclude one or more bots from consideration based on its trust level.

At block 330, method 300 includes determining user information to provide to the bot. For example, service information determiner 228 can determine user information of the user to provide to bot 232 for the performing of the automated task. Content of the user information is based on the bots associated trust level (e.g., trust level 264) and service parameters (e.g., determined from service requirements 260, service options 262, service types 266, and/or shared information 268) for completing the automated task.

At block 340, method 300 includes providing the user information to the bot. For example, bot interface manager 220 (e.g., user application 208, which may be a bot) can provide, by the first bot, the determined user information to bot 232 using one or more network communications. For example, the information can be provided via a chat user interface of bot 232, non-conversational interface, a non-user interface, and the like. Further, the information can be provided in a conversational form, a non-conversational form, or a tokenized form, as examples.

Figure 4:
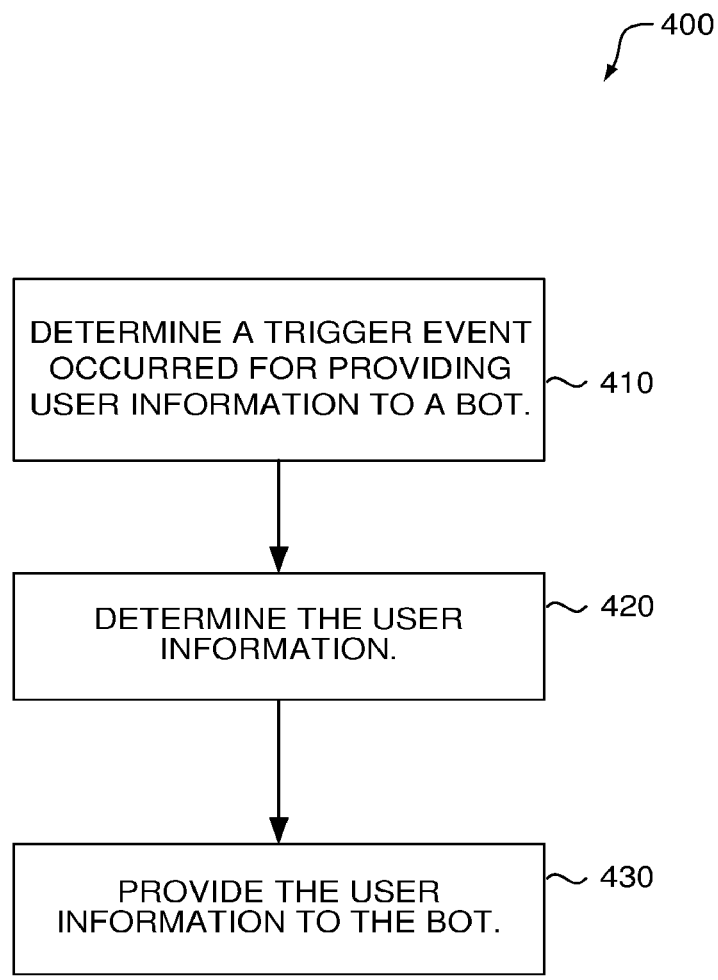
FIG. 4 depicts a flow diagram of a method for sharing user information with bots, in accordance with embodiments of the present disclosure.

Referring now to FIG. 4, a flow diagram is provided showing an embodiment of a method 400 for sharing user information with bots. At block 410, method 400 includes determining a trigger event occurred for providing user information to a bot. For example, bot interface manager 220 can determine from sensor data from the at least one user device that is provided using user-data collection component 210, that a trigger event occurred. The trigger event can be for providing user information of a user to bot 232 to facilitate bot 232 performing an automated task on behalf of the user. As an example bot interface manager 220 could analyze messages from the user and/or bot 232 or user application 208 that are exchanged in a conversational interface or other user interface of bot 232 or user application 208 to determine whether a trigger event has occurred. In addition or instead this could include bot interface manager 220 detecting initiation of a user session with bot 232, such as based on loading or launching bot 232, the user navigating to a website containing bot 232, and/or a URL detected in a web browser.

At block 420, method 400 includes determining the user information. For example, service information determiner 228 can determine the user information of the user to provide to bot 232 for the performing of the automated task. In doing so, content of the user information can be based on a trust level of bot 232 and service parameters for completing the automated task.

At block 430, method 400 includes providing the user information to the bot. For example, bot interface manager 220 can provide the determined user information to bot 232 using one or more messages (e.g., transmitted over network 110).

Figure 5:
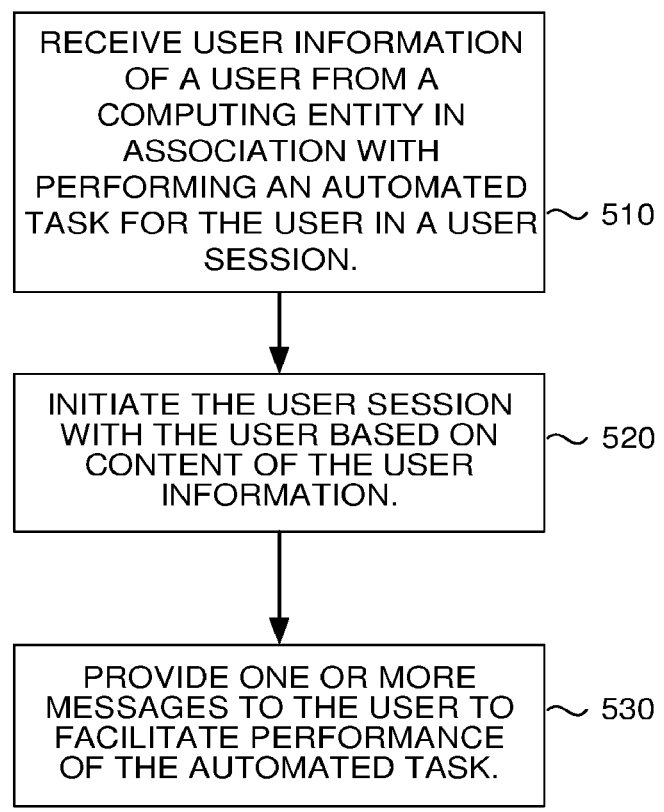
FIG. 5 depicts a flow diagram of a method for sharing user information with bots, in accordance with embodiments of the present disclosure.

Referring now to FIG. 5, a flow diagram is provided showing an embodiment of a method 500 for sharing user information with bots. At block 510, method 500 includes receiving user information of a user from a computing entity in association with performing an automated task for the user in a user session. For example, bot 232 (or user application 208) may receive user information of a user from bot interface manager 220 (e.g., user application 208). Service information determiner 228 may determine content of the user information, as described above.

At block 520, method 500 includes initiating the user session with the user based on content of the user information. For example, bot 232 can initiate a user session with the user based on content of the user information (e.g., static user information and/or dynamic user information).

At block 530, method 500 includes providing one or more messages to the user facilitate performance of the automated task. For example, based on the user information, user context determiner 274 can determine user context of the user, state determiner 276 can determine a state of bot 232, and/or bot 232 can determine one or more action variants 280, and one or more corresponding messages may be provided to the user (e.g., in a conversational interface of bot 232). Thus, the user information can causes bot 232 to determine and enter a state based on the content of the user information. The state can be of a plurality of states of a state-based conversational model, where each state defines messages for the bot to provide to the user to facilitate the performing of the automated task. In addition or instead, the user information can cause bot 232 to select from one or more action variants 280 for interaction with the user. This could include selecting an abbreviated version of a dialogue sequence to provide to the user (e.g., based on user context or a user preference indicating the user is in a hurry or does not prefer to listen to options).

Figure 6:
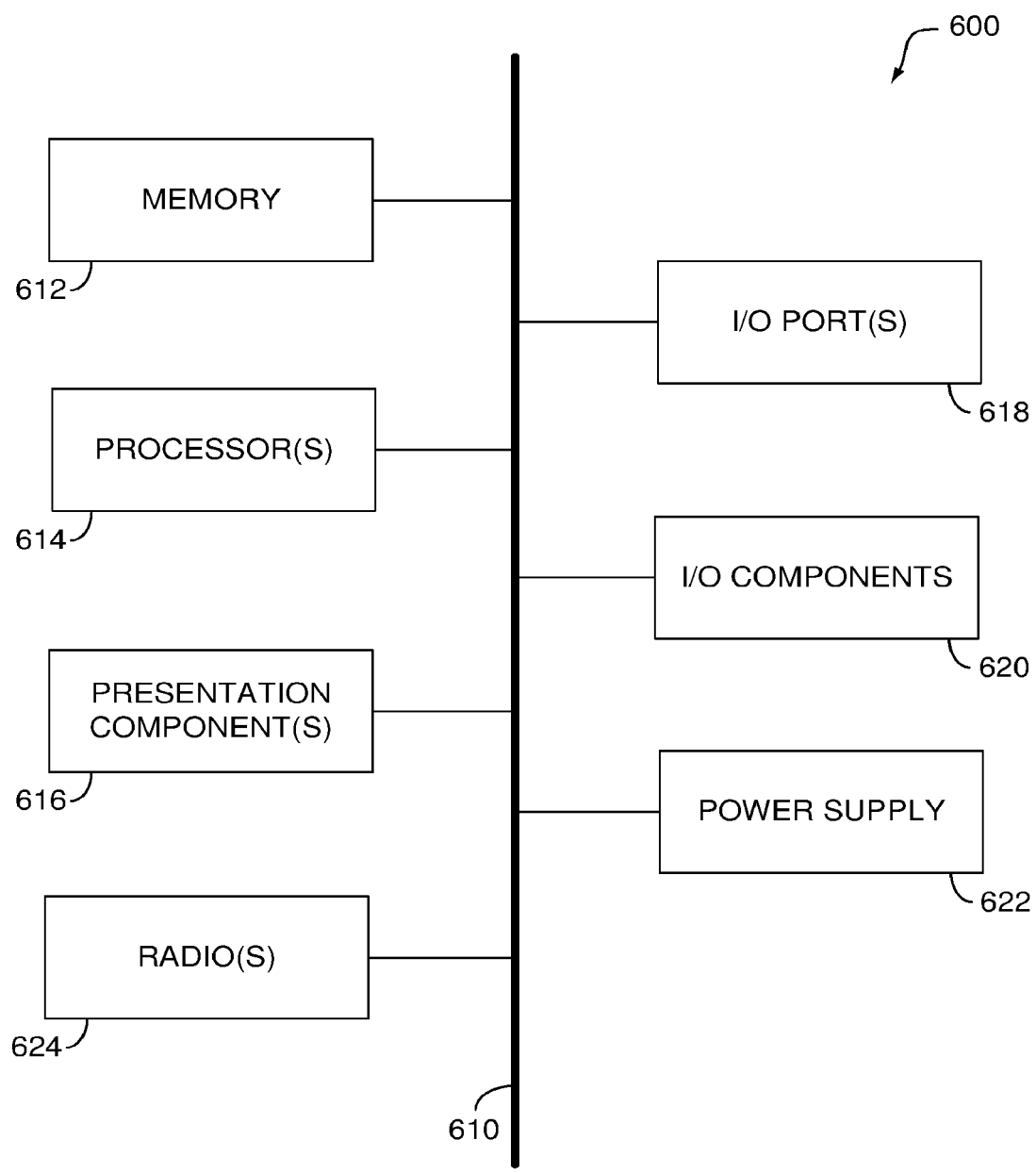
FIG. 6 is a block diagram of an exemplary computing environment suitable for use in implementing embodiments of the present disclosure.

Having described various implementations, an exemplary computing environment suitable for implementing embodiments of the disclosure is now described. With reference to FIG. 6, an exemplary computing device is provided and referred to generally as computing device 600. The computing device 600 is but one example of a suitable computing environment and is not intended to suggest any limitation as to the scope of use or functionality of embodiments of the disclosure. Neither should the computing device 600 be interpreted as having any dependency or requirement relating to any one or combination of components illustrated.

Embodiments of the disclosure may be described in the general context of computer code or machine-useable instructions, including computer-useable or computer-executable instructions, such as program modules, being executed by a computer or other machine, such as a personal data assistant, a smartphone, a tablet PC, or other handheld device. Generally, program modules, including routines, programs, objects, components, data structures, and the like, refer to code that performs particular tasks or implements particular abstract data types. Embodiments of the disclosure may be practiced in a variety of system configurations, including handheld devices, consumer electronics, general-purpose computers, more specialty computing devices, or similar devices or configurations. Embodiments of the disclosure may also be practiced in distributed computing environments where tasks are performed by remote-processing devices that are linked through a communications network. In a distributed computing environment, program modules may be located in both local and remote computer storage media including memory storage devices.

With reference to FIG. 6, computing device 600 includes a bus 610 that directly or indirectly couples the following devices: memory 612, one or more processors 614, one or more presentation components 616, one or more input/output (I/O) ports 618, one or more I/O components 620, and an illustrative power supply 622. Bus 610 represents what may be one or more busses (such as an address bus, data bus, or combination thereof). Although the various blocks of FIG. 6 are shown with lines for the sake of clarity, in reality, these blocks represent logical, not necessarily actual, components. For example, one may consider a presentation component such as a display device to be an I/O component. Also, processors have memory. The inventors hereof recognize that such is the nature of the art and reiterate that the diagram of FIG. 6 is merely illustrative of an exemplary computing device that can be used in connection with one or more embodiments of the present disclosure. Distinction is not made between such categories as "workstation," "server," "laptop," "handheld device," etc., as all are contemplated within the scope of FIG. 6 and with reference to "computing device."

Computing device 600 typically includes a variety of computer-readable media. Computer-readable media can be any available media that can be accessed by computing device 600 and includes both volatile and nonvolatile, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVDs) or other optical disk storage, magnetic cassettes, magnetic tape, magnetic disk storage or other magnetic storage devices, or any other medium which can be used to store the desired information and which can be accessed by computing device 600. Computer storage media does not comprise signals per se. Communication media typically embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media, such as a wired network or direct-wired connection, and wireless media, such as acoustic, RF, infrared, and other wireless media. Combinations of any of the above should also be included within the scope of computer-readable media.

Memory 612 includes computer storage media in the form of volatile and/or nonvolatile memory. The memory may be removable, non-removable, or a combination thereof. Exemplary hardware devices include solid-state memory, hard drives, optical-disc drives, or similar memory devices or hardware. Computing device 600 includes one or more processors 614 that read data from various entities such as memory 612 or I/O components 620. Presentation component(s) 616 presents data indications to a user or other device. Exemplary presentation components include a display device, speaker, printing component, vibrating component, and the like.

The I/O ports 618 allow computing device 600 to be logically coupled to other devices, including I/O components 620, some of which may be built in. Illustrative components include a microphone, joystick, game pad, satellite dish, scanner, printer, wireless device, or similar components utilized for I/O functionality. The I/O components 620 may provide a natural user interface (NUI) that processes air gestures, voice, or other physiological inputs generated by a user. In some instances, inputs may be transmitted to an appropriate network element for further processing. An NUI may implement any combination of speech recognition, touch and stylus recognition, facial recognition, biometric recognition, gesture recognition both on screen and adjacent to the screen, air gestures, head and eye tracking, and touch recognition associated with displays on the computing device 600. The computing device 600 may be equipped with depth cameras, such as stereoscopic camera systems, infrared camera systems, RGB camera systems, and combinations of these, for gesture detection and recognition. Additionally, the computing device 600 may be equipped with accelerometers or gyroscopes that enable detection of motion. The output of the accelerometers or gyroscopes may be provided to the display of the computing device 600 to render immersive augmented reality or virtual reality.

Some embodiments of computing device 600 may include one or more radio(s) 624 (or similar wireless communication components). The radio 624 transmits and receives radio or wireless communications. The computing device 600 may be a wireless terminal adapted to receive communications and media over various wireless networks. Computing device 600 may communicate via wireless protocols, such as code division multiple access ("CDMA"), global system for mobiles ("GSM"), or time division multiple access ("TDMA"), as well as others, to communicate with other devices. The radio communications may be a short-range connection, a long-range connection, or a combination of both a short-range and a long-range wireless telecommunications connection. When we refer to "short" and "long" types of connections, we do not mean to refer to the spatial relation between two devices. Instead, we are generally referring to short range and long range as different categories, or types, of connections (i.e., a primary connection and a secondary connection). A short-range connection may include, by way of example and not limitation, a Wi-Fi® connection to a device (e.g., mobile hotspot) that provides access to a wireless communications network, such as a WLAN connection using the 802.11 protocol; a Bluetooth connection to another computing device is a second example of a short-range connection, or a near-field communication connection. A long-range connection may include a connection using, by way of example and not limitation, one or more of CDMA, GPRS, GSM, TDMA, and 802.16 protocols.

Example Embodiments

Embodiment 1. A computer-performed method for sharing information with bots, the method comprising: determining, from at least one user message provided to a user interface of a first bot, an automated task to be performed on behalf of a user; determining a second bot is capable of performing the automated task on behalf of the user; determining user information of the user to provide to the second bot for the performing of the automated task, wherein content of the user information is based on a trust level of the second bot and service parameters for completing the automated task; and providing, by the first bot, the determined user information to the second bot using one or more network communications.

Embodiment 2. The method of claim 1, wherein the determining the user information comprises determining a level of specificity of the content based on the trust level.

Embodiment 3. The method of claim 1-2, wherein the determining the user information comprises determining whether to include content items in the content based on the trust level.

Embodiment 4. The method of claim 1-3, wherein the providing of the determined user information to the second bot is through a non-conversational interface of the second bot.

Embodiment 5. The method of claim 1-4, wherein the content of the user information is provided to the second bot in a tokenized form.

Embodiment 6. The method of claim 1-5, wherein the trust level is based on one or more previous interactions with the second bot, the one or more previous interactions comprising providing the second bot with user information of at least one user.

Embodiment 7. The method of claim 1-6, further comprising providing the second bot with constraints on the second bot sharing the user information with at least one other bot, wherein the trust level is based on determining whether the second bot complied with the constraints.

Embodiment 8. The method of claim 1-7, further comprising: building a user profile of the user from user data associated with the user, the user data being from sensor data from at least one user device provided by one or more sensors prior to a user session with the first bot that includes the at least one message; and accessing a data store comprising the user profile to retrieve at least some of the user information.

Embodiment 9. The method of claim 1-8, further comprising: building a bot profile of the second bot from bot data associated with the second bot, the bot data being from sensor data from at least one user device provided by one or more sensors prior to a user session with the first bot that includes the at least one message; and accessing a data store comprising the bot profile to determine at least some of the service parameters for completing the automated task.

Embodiment 10. The method of claim 1-9, further comprising determining service requirements of the second bot from bot data extracted from a plurality of user sessions with the second bot, wherein the service parameters comprise the determined service requirements of the second bot.

Embodiment 11. A computer-implemented system, comprising: one or more sensors configured to provide sensor data from at least one user device; one or more processors; and one or more computer storage media storing computer-useable instructions that, when executed by the one or more processors, cause the one or more processors to perform a method comprising: determining, from the sensor data from the at least one user device, a trigger event occurred, the trigger event being for providing user information of a user to a bot to facilitate the bot performing an automated task on behalf of the user; determining the user information of the user to provide to the bot for the performing of the automated task, wherein content of the user information is based on a trust level of the bot and service parameters for completing the automated task; and performing the providing of the determined user information to the bot using one or more messages.

Embodiment 12. The computer-implemented system of claim 10-11, wherein the content of the user information comprises current contextual information of the user.

Embodiment 13. The computer-implemented system of claim 10-12, wherein the trigger event comprises the bot being launched on the at least one user device to initiate a user session with the user, and the determined user information is provided to the bot prior to user messages from the user being provided to the bot.

Embodiment 14. The computer-implemented system of claim 10-13, wherein the providing the determined user information to the bot causes the bot to initiate a user session with the user for the performing an automated task based on the content of the user information.

Embodiment 15. The computer-implemented system of claim 10-14, wherein the user information causes the bot to determine and enter a state based on the content of the user information, the state being of a plurality of states of a state-based conversational model, each of the states defining messages for the bot to provide to the user to facilitate the performing of the automated task.

Embodiment 16. The computer-implemented system of claim 10-15, wherein the user information causes the bot to provide an abbreviated version of a dialogue sequence to the user.

Embodiment 17. The computer-implemented system of claim 10-16, wherein the user information causes the bot to provide an abbreviated version of a dialogue sequence to the user.

Embodiment 18. The computer-implemented system of claim 10-17, wherein the determining the trigger event occurred is based on analyzing one or more messages provided by the user to a different bot than the bot.

Embodiment 19. One or more computer storage devices storing computer-useable instructions that, when executed by one or more computing devices, cause the one or more computing devices to perform a method comprising: determining, from at least one user message provided to a user interface of a first bot, an automated task to be performed on behalf of a user; determining a second bot is capable of performing the automated task on behalf of the user; determining user information of the user to provide to the second bot for the performing of the automated task, wherein content of the user information is based on a trust level of the second bot and service parameters for completing the automated task; and providing the determined user information to the second bot using one or more network communications.

Embodiment 20. The one or more computer storage devices of claim 19, wherein the determining the user information comprises determining a level of specificity of the content based on the trust level.

Many different arrangements of the various components depicted, as well as components not shown, are possible without departing from the scope of the claims below. Embodiments of the disclosure have been described with the intent to be illustrative rather than restrictive. Alternative embodiments will become apparent to readers of this disclosure after and because of reading it. Alternative means of implementing the aforementioned can be completed without departing from the scope of the claims below. Certain features and sub-combinations are of utility and may be employed without reference to other features and sub-combinations and are contemplated within the scope of the claims.

What is claimed is:

1. A method, comprising:
    initiating a session between a bot and a computing device associated with a user, the bot being associated with a plurality of states and each of the plurality of states having an associated message;
    receiving, from the computing device associated with the user, user information associated with the user;
    determining a context associated with the user information, wherein the context is associated with causing selection of an abbreviated version of a dialogue sequence to provide to the user;
    selecting a particular state of the bot from the plurality of states based on analyzing the user information, wherein each of the plurality of states defines corresponding messages for the bot to provide to the user to facilitate performing an automated task;
    assigning the particular state to the bot, the particular state being associated with a particular message; and
    causing an interaction between the bot and the computing device associated with the user based, at least in part, on the abbreviated version of the dialogue sequence, the particular state and the particular message.

2. The method of claim 1, further comprising receiving additional user information based on the interaction.

3. The method of claim 2, further comprising causing the bot to perform a particular action based, at least in part, on the additional user information.

4. The method of claim 1, further comprising assigning the bot an initial state prior to assigning the bot the particular state.

5. The method of claim 1, further comprising, wherein the user information is associated with causing the bot to operate based on a level of trust of the bot, one or more bot factors, and service parameters for completing the automated task.

6. The method of claim 1, wherein the user information includes spoken dialog information.

7. The method of claim 1, wherein assigning the particular state to the bot occurs prior to initiating a dialog session with the user via the computing device associated with the user, wherein the dialog session is associated with corresponding messages of the particular state assigned to the bot.

8. The method of claim 1, wherein a quantity of user information provided to the bot is based, at least in part, on a trust level associated with the bot.

9. The method of claim 1, wherein assigning the particular state to the bot comprises skipping a preliminary state of the bot in order to assign the particular state to the bot.

10. A system, comprising:
    a processor; and
    a memory communicatively coupled to the processor and storing instructions that, when executed by the processor, perform operations, comprising:
    receiving user information associated with the user;
    determining a context associated with the user information, wherein the context is associated with causing selection of an abbreviated version of a dialogue sequence to provide to the user;
    assigning a particular state to a bot based, at least in part, on an analysis of the user information, the particular state of the bot being associated with a particular message; and
    causing the bot to perform a particular action based, at least in part, on the abbreviated version of the dialogue sequence, the state of the bot and information associated with the particular message.

11. The system of claim 10, further comprising instructions for assigning the bot an initial state prior to assigning the bot the particular state.

12. The system of claim 10, further comprising instructions for determining a context associated with the user information.

13. The system of claim 10, wherein the user information includes spoken dialog information.

14. The system of claim 10, wherein assigning the particular state to the bot occurs prior to initiating a dialog session with the user.

15. The system of claim 10, further comprising, determining a level of trust associated with the bot, wherein a quantity of user information provided to the bot is based, at least in part, on the level of trust associated with the bot.

16. A method, comprising:
    receiving user information associated with the user, wherein the user information is associated with causing a bot to operate based on a level of trust of the bot, one or more bot factors, and service parameters for completing an automated task;
    assigning a particular state to the bot based, at least in part, on an analysis of the user information, the particular state of the bot being associated with a particular message, wherein the particular state defines the particular message for the bot to provide to the user to facilitate performing the automated task; and causing the bot to perform a particular action based, at least in part, on the level of trust of the bot, the state of the bot and information associated with the particular message.

17. The method of claim 16, further comprising assigning the bot an initial state prior to assigning the bot the particular state.

18. The method of claim 16, further comprising determining a context associated with the user information.

19. The method of claim 16, wherein the user information includes spoken dialog information.

20. The method of claim 16, wherein assigning the particular state to the bot occurs prior to initiating a dialog session with the user.

* * * * *